(No Model.) 3 Sheets—Sheet 1.
E. D. WHIPPLE.
CAR COUPLING.
No. 561,150. Patented June 2, 1896.
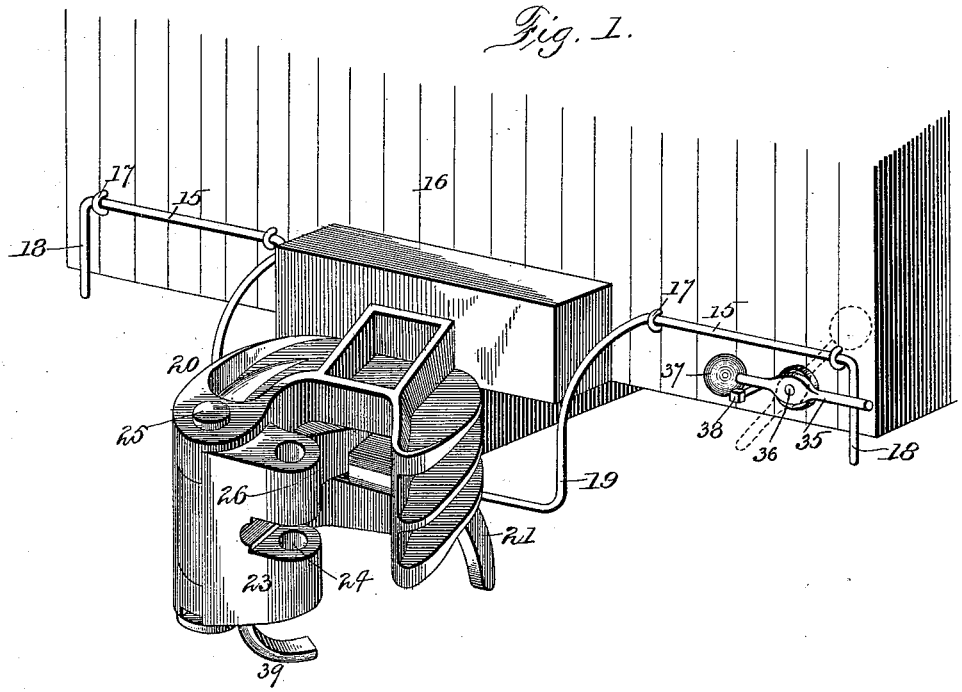
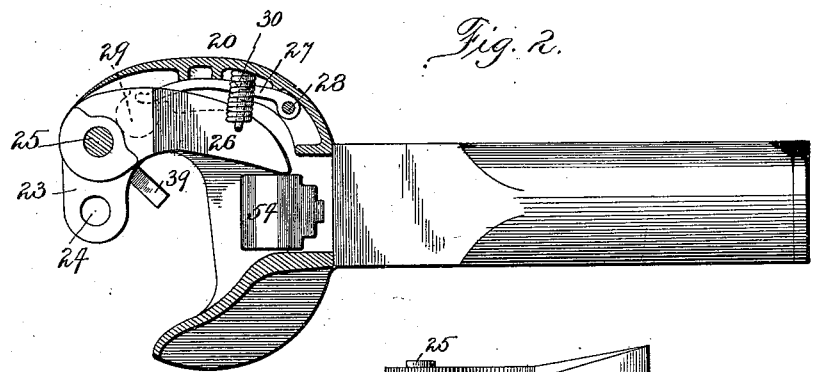
Witnesses:
John Enders Jr.
L. M. Bulkley
Inventor
Eugene D. Whipple
by Chas. C. Bulkley,
Attorney.

(No Model.) 3 Sheets—Sheet 2.
E. D. WHIPPLE.
CAR COUPLING.
No. 561,150. Patented June 2, 1896.
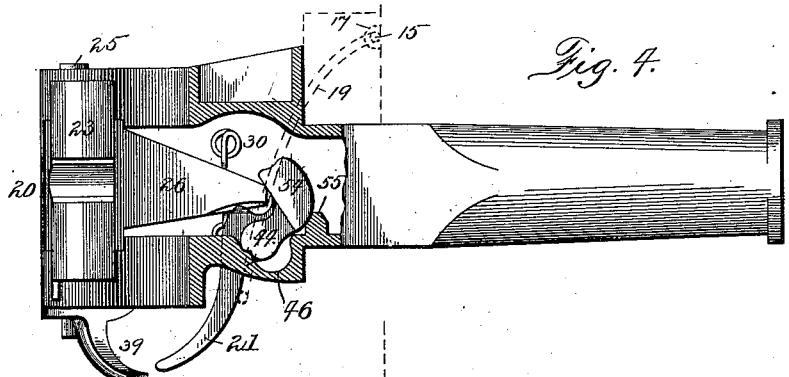
Fig. 4.
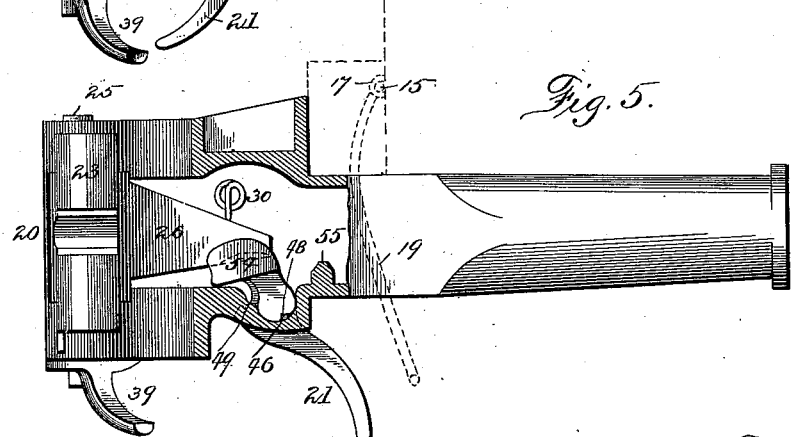
Fig. 5.
Fig. 7. Fig. 6. Fig. 8. Fig. 9.
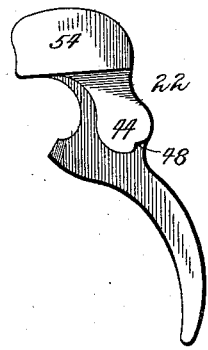 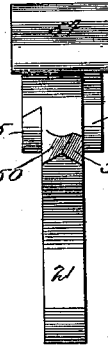 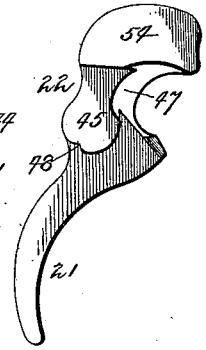 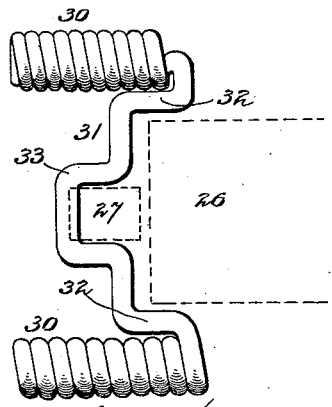
Fig. 10.
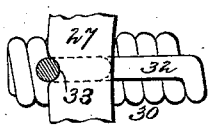
Witnesses:
John Enders, jr.
L. N. Bulkley
Inventor
Eugene D. Whipple,
by Chas. C. Bulkley.
Attorney.

(No Model.) 3 Sheets—Sheet 3.
E. D. WHIPPLE.
CAR COUPLING.
No. 561,150. Patented June 2, 1896.
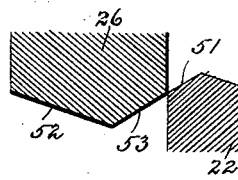
Fig. 11.
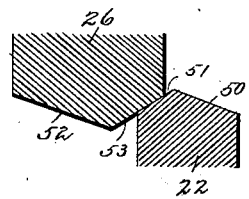
Fig. 12.
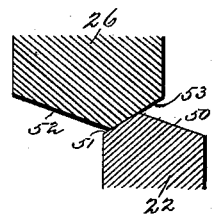
Fig. 13.
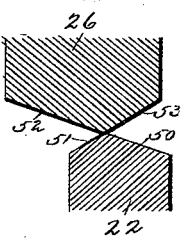
Fig. 14.
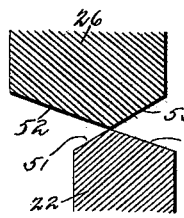
Fig. 18.
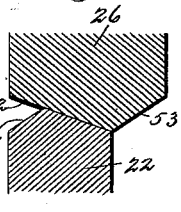
Fig. 17.
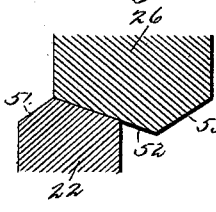
Fig. 16.
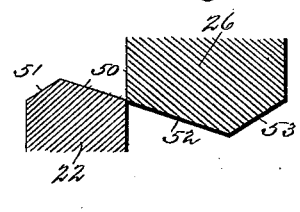
Fig. 15.
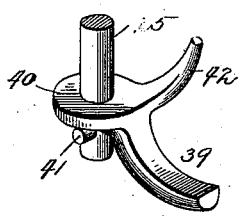
Fig. 19.
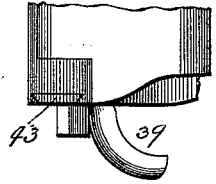
Fig. 21.
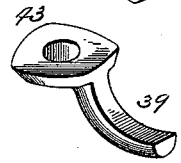
Fig. 22.
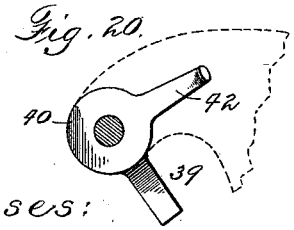
Fig. 20.
Fig. 23.
Witnesses:
John Enders Jr.
L. M. Bulkley
Inventor
Eugene D. Whipple,
by Chas. C. Bulkley.
Attorney.

UNITED STATES PATENT OFFICE.

EUGENE D. WHIPPLE, OF CRESTON, IOWA.

CAR-COUPLING.

SPECIFICATION forming part of Letters Patent No. 561,150, dated June 2, 1896.

Application filed March 28, 1894. Serial No. 505,513. (No model.)

*To all whom it may concern:*

Be it known that I, EUGENE D. WHIPPLE, a citizen of the United States, residing at Creston, in the county of Union and State of Iowa, have invented certain new and useful Improvements in Car-Couplers, of which the following is a specification, reference being had therein to the accompanying drawings.

My invention relates to that class of car-couplers known as the "vertical-plane" type, in which a vertically-hinged knuckle is employed together with a locking-block.

My invention has for its object the provision of means by which the locking-block may be securely held in an unlocked position, so that the said block cannot by jarring or from other causes be brought into a locked position inopportunely, and by which the locking-block is automatically initially actuated to cause said block to pass a given center of gravity, so that the same shall always fall by gravity into a locking position from the unlocking position, this result being accomplished without bringing to bear upon the locking-block a sustained backward push.

My invention has for its further object the provision of means by which certain defects in construction and operation of the means employed in automatically opening the knuckle are avoided, with my device the doubling of the spring employed being overcome and opportunity afforded for the use of sets of springs which are longer, and which, in conjunction with an interposed member, directly act upon the impact-arm of the knuckle and are in turn directly acted upon by said impact-arm.

My invention has for a further object the provision of means by which when from any cause one of a pair of intermembering draw-heads becomes detached or lowered in position from its proper position said draw-head is engaged and held up in the proper position, the device employed being adapted for ready removal or readjustment and thus made capable for use in conjunction with any coupler of this type and permitting the positioning of the means for fastening the knuckle-pin beneath the draw-head instead of above the same, in which latter position the said means are more liable to be broken, thus unfastening the knuckle-pin, which then releases the knuckle, causing an uncoupling, the member upon which the disengaged draw-head falls being so disposed as to extend to a central point underneath the draw-head to be engaged.

My invention has as another object the provision of means by which the manually-operated device on the end or side of the car may be locked and may be acted upon and held so as to maintain the locking-block in an unlocked position, the devices for accomplishing this result being capable of such a disposition as to be inoperative to permit the use of the manually-operating devices freely in yard service.

Reference may now be had to the accompanying drawings for a detailed description of my invention and also for a further statement of advantages and defects overcome, in which—

Figure 1 is a perspective view of my improved coupler shown attached in position upon the end of a car, the knuckle being closed. Fig. 2 is a plan view of the same shown detached from the car, the top plate of the draw-bar being removed and showing the engagement of the impact-arm of the knuckle with the locking-block, thus locking the knuckle, and also showing in full and dotted lines the device for automatically opening the knuckle. Fig. 3 is a side view of two of my improved draw-heads interlocked or in a coupled position, showing the relation of the device for engaging a draw-head which falls or lowers from its normal plane, one of said draw-heads being shown in dotted lines. Fig. 4 is a central longitudinal sectional view through the draw-head, showing the knuckle closed and the locking-block thrown back into its unlocked position. Fig. 5 is a like view showing the locking-block in a forward position engaging the end of the impact-arm and locking the knuckle. Fig. 6 is a view of the front edge of the locking-block. Figs. 7 and 8 are respectively views of each side of the locking-block. Figs. 9 and 10 are respectively detail views illustrating the devices for automatically opening the knuckle. Figs. 11 to 14, inclusive, are diagrammatic views illustrating the relative positions of the bevel faces, respectively, on the impact-arm and on the locking-block during the movement of the former in the shifting of the knuckle from an open into a closed position when the locking-block happens to have been improperly retracted into an unlocking position. Figs. 15 to 18, inclusive, are like views illustrating the relative position of the bevel faces in the opening of the knuckle. Figs. 19 and 20 are respectively views illustrating the manner of securing the safety-arm in position. Figs. 21, 22, and 23 are respectively views illustrating another manner of securing said safety-arm in position.

The manually-operating devices consist of rock-bars 15, secured on the end of the car 16 by means of clips 17, the handles 18, normally depending at each side of the car, and the actuating-loop 19, passing underneath the draw-head 20 and adapted to engage against the rear end of the depending operating-arm 21 of the locking-block 22, which latter is centrally disposed within the hollow interior of the draw-head, and the operating-arm 21 of said locking-block 22 extending through a slot or opening in the under side of the draw-head.

The knuckle is designated at 23, perforated vertically at 24 to provide means for coupling with a link and pin in the well-known manner when necessitated, said knuckle being hinged to the draw-head 20 by means of the knuckle-pin 25. The rearwardly-extended impact-arm 26 integrally formed with the knuckle 23 and positioned at right angles, or nearly so, relative to said knuckle is of the ordinary form, with the exception of certain particulars which will be hereinafter set forth.

I will now proceed to a description, first, of the means by which the knuckle is automatically opened. (Shown in Figs. 8 and 9.) A lever-arm 27 is provided, disposed within the interior of the draw-head 20, pivoted at 28 and extended forwardly from said pivot-point, so that the free end of said lever-arm shall terminate and move within a recess 29, (shown by the dotted lines in Fig. 2,) located in the impact-arm 26. A pair of spiral springs 30 are provided, connected together by means of a straddle-rod 31, which latter is preferably made integral with the springs 30 from a continuous length of material, as shown in Fig. 9. The springs 30 and the straddle-rod 31 are vertically positioned within the interior of the draw-head 20, the said straddle-rod 31 being so looped at 32 as to be adapted to engage over the upper and lower sides of the impact-arm 26, and also so looped at 33 as to straddle over the upper and lower sides of the lever-arm 27, said loop 33 being constantly pressed against the lever-arm 27, in turn the latter being constantly pressed against the impact-arm 26, this constant pressure being maintained by means of the springs 30, the ends of which rest against the side wall of the draw-head. The side of the lever-arm 27 against which the loop 33 of the straddle-rod 31 bears is recessed at 34, as shown in Fig. 10, so that said straddle-rod is securely connected with the lever-arm 27.

As shown in Fig. 2, the knuckle 23 is closed and locked, the springs 30 being in this position compressed, so that the end of the lever-arm 27 presses strongly against the impact-arm 26. When now the locking-block 22 is withdrawn, the pivoted lever-arm 27, under the influence of the compressed springs 30, pushes upon the impact-arm 26 and automatically opens the knuckle 23, the end of the lever-arm 27 moving within the recess 29.

It is essential in order to prevent the doubling of the springs that the same should bear approximately squarely against the resisting object, this result being accomplished with my device by reason of the close proximity of the bearing-point of the springs 30 to the pivot-point 28 of the lever-arm 27 and the comparatively small path traversed by the end of the said lever-arm in opening the knuckle. In my form of construction, by reason of the straddling of the rod 31, I am enabled to use longer springs 30 and multiply the number of the same by disposing one above the other, the whole structure being placed within a very small compass.

In Fig. 1 I have shown a locking arm or lever 35 pivoted at 36 upon the end of the car and having at one end the weight 37, said locking-lever assuming the position shown by the dotted lines when not in use and resting against one of the clips 17. A pin 38, projected from the end of the car, serves to sustain the locking-lever 35 in the horizontal plane shown by the full lines when the same is being used.

When the lever-arm 35 is engaged over one of the handles 18, as shown in Fig. 1, the handles 18 are locked from movement, so that the actuating-loop 19 cannot be brought to bear against the operating-arm 21, and thus the locking-block cannot be unlocked or dislodged from its engaging position with the impact-arm 26 except by hand. When the handle 18, in proximity to said locking-lever 35, is thrown forward and the end portion of said lever disposed between it and the end of the car, the locking-block is back in its unlocked position, as shown in Fig. 4, and held in this position by means of the locking-lever 35.

I provide a safety engaging arm 39, which is located on the under side of the draw-head 20 and extended toward the center thereof, and therefore does not project outwardly from the draw-head in such a manner as to be apt to be broken off, and also is in such a position as to receive a falling or dislodged intermembering draw-head, as shown by the dotted lines in Fig. 3. This safety engaging arm 39 is secured upon the draw-head in either one of two ways. As shown in Figs. 19 and 20, a perforated plate 40 is provided, adapted to engage over the under end of the knuckle-pin 25, a pin 41 holding the said knuckle-pin in place and a tang 42 holding the plate in place by engaging between the ridges on the draw-head.

As shown in Figs. 21, 22, and 23, the perforated plate 43 has beveled edges, so as to be adapted for meshing with the bevel grooves formed on the draw-head, so that said plate 43 may be secured and held in place by a dovetail joint, the tang 42 being dispensed with in the ordinary usage of the apparatus. It will be observed that with this manner of connection I fasten the knuckle-pin at the under side of the draw-head when the safety-arm 39 is used, thus avoiding the danger resulting from securing the knuckle-pin at the upper side of the draw-head, which knuckle-pin, when the fastenings are broken, falls through and away from the draw-head, releasing the knuckle 23 and effecting an uncoupling inopportunely and creating a liability to cause a wreck.

I will now describe the construction and manner of conjunctive operation of the locking-block 22 and the impact-arm 26, having reference first to the character of journal-bearings for the said locking-block. The locking-block 22 has riding journals 44 45 on each of its sides, Figs. 6, 7, and 8, the riding faces of which journals 44 45 are approximately circular and adapted to travel upon the approximately circular bearings 46, formed in the lower wall of the draw-head, Figs. 4 and 5. The locking-block 22 has a cut-out 47, which is simply to permit the end of the impact-arm 26 to clear said block. The riding faces of the journals 44 45 are notched at 48, which notches are adapted to engage with the notches on the draw-head. (Shown at 49.) On the front edge of the locking-block two beveled faces are formed, (designated at 50 and 51, Fig. 6,) the bevel 52 on the impact-arm 26, Figs. 11 to 15, inclusive, engaging against the bevel face 50 in the movement of the knuckle 23 from a closed into an open position.

The bevel face 53 on the end of the impact-arm 26 engages against the bevel 51 on the locking-block 22 in the movement of the knuckle 23 from an open to a closed position. It will be understood, however, that these engaging bevel faces 51 and 53 are only provided as an additional precaution, since the impact-arm 26 in the opening of the knuckle 23 always throws the locking-block into a locking position, as shown in Fig. 5, which position is normally maintained unless improperly interfered with. The impact-arm 26 in the closing of the knuckle 23 simply bearing against the forward end edge of the locking-head 54 raises the same slightly sufficiently to permit the end of the impact-arm to pass by said block 22, which block then falls back into its locking position.

I have illustrated the various positions assumed and the relationship of the bevel faces 51 on the locking-block 22 and the bevel face 53 on the impact-arm 26, when the knuckle 23 is being closed in Figs. 11 to 14, inclusive, and the same with reference to the bevel face 50 on the locking-block and the bevel face 52 on the impact-arm in the movement of the knuckle 23 from a closed into an open position in Figs. 15 to 18, inclusive, as stated, the bevel faces 51 and 53 in the former instance being employed only as an additional precaution, while in the latter the bevel faces 50 and 52 are engaged in the usual operation of the coupler in automatically causing the locking-block to fall into a locking position. Positioned in the rear of the locking-block 22 is a transverse ledge 55.

Referring to Fig. 5, in which the knuckle is shown locked, it will be observed that the circular journals 44 45 on the locking-block 22 are closely conformed to the circular bearings 46 on the draw-head, so that in the movement of the locking-blocks in the retracting of the block into an unlocking position there is no change or shifting of base or the center of rotation of the block until the notches 48 and 49 coincide when the locking-block has a slight forward movement to engage said notches, as shown in Fig. 4, the said block being then held securely in its retracted unlocked position resting upon the ledge 55.

The knuckle 23 by the action of the springs 30 is automatically opened in readiness to effect a coupling when the locking-block 22 is in its unlocked position, it being understood, however, that this action causes the bevel face 52 of the impact-arm 26 to engage the bevel face 50 of the locking-block 22. The impact-arm 26 bearing or pressing forwardly upon the locking-block 22, Figs. 15 to 18, inclusive, and thus dislodging the two engaging notches 48 and 49 and imparting an initial impulse forwardly to said locking-block causes the same to pass its center of gravity and then to fall into its locking position.

Having thus described my invention, what I claim as new therein, and desire to secure by Letters Patent, is—

1. In a car-coupler of the vertical-plane type the combination with the hinged knuckle and the impact-arm, of a swinging locking-block having an engaging abutment or notch thereon and an abutment or notch upon the draw-head adapted to engage with said former abutment or notch when the locking-block is retracted into its unlocked position said locking-block also having journals resting in and moving upon bearings in the draw-head, said locking-block being loosely mounted within its journal-bearings.

2. In a car-coupler of the vertical-plane type the combination with the knuckle and the impact-arm, of a swinging locking-block an engaging face on said locking-block against which the impact-arm contacts in the opening of the knuckle to impart to the said block an initial movement from its unlocked position, an abutment or abutments upon the draw-head adapted to engage with an abutment or abutments on the locking-block when the latter is retracted into its unlocked position and intermembering journal-bearings on the locking-block and draw-head whereby the locking-block rotates in falling by gravity into a locking position about a constant center of rotation.

3. In a car-coupler of the vertical-plane type the combination with the knuckle and the impact-arm, of a swinging locking-block, an engaging face on said locking-block in the form of a bevel against which a bevel face on the impact-arm bears or presses in the opening of the knuckle, an abutment or abutments upon the draw-head engaged with an abutment or abutments on the locking-block when the latter is retracted into its unlocked position, the bevel face of the impact-arm in its engagement with the bevel face on the locking-block disengaging the locking-block from its secured position by virtue of the intermembering abutments and intermembering journal-bearings on the locking-block and draw-head whereby the locking-block rotates in falling by gravity into a locking position about a constant center of rotation.

4. In a car-coupler of the vertical-plane type a removable and replaceable safety-arm secured to a perforated plate-piece which latter is detachably held upon the under side of the draw-head by a dovetail connection, the said safety-arm extending toward the center of the draw-head.

5. In a car-coupler of the vertical-plane type a removable and replaceable safety-arm, a perforated plate from which the said safety-arm projects and a knuckle-pin extended through the perforation of the plate and means for holding the safety-arm and plate on the knuckle-pin.

6. In a car-coupler, a safety-arm projected from a plate held on the draw-head and a tang engaging the draw-head to hold the plate in position.

7. In a car-coupler a removable and replaceable safety-arm, a perforated plate from which said safety-arm projects which plate is held upon the under side of the draw-head by a dovetail connection and a knuckle-pin passing through the plate and held thereto.

In testimony whereof I affix my signature in presence of two witnesses.

EUGENE D. WHIPPLE.

Witnesses:
L. M. BULKLEY,
C. C. BULKLEY.